United States Patent
Walz (10) Patent No.: US 10,801,552 B2
(45) Date of Patent: Oct. 13, 2020

(54) TORQUE-DEPENDANT, RELEASABLE CLUTCH FOR A HAND-HELD POWER TOOL

(71) Applicant: C. & E. Fein GmbH, Schwaebisch Gmuend-Bargau (DE)

(72) Inventor: Frank Walz, Heubach (DE)

(73) Assignee: C&E Fein GmbH, Schwaebisch Gmuend-Bargau (*) Notice: Subject to any disclaimer, the term of this patent is extended or adjusted under 35 U.S.C. 154(b) by 67 days.

(21) Appl. No.: 16/046,604

(22) Filed: Jul. 26, 2018

(65) Prior Publication Data

US 2020/0032855 A1    Jan. 30, 2020

(51) Int. Cl.
| | |
|---|---|
| *F16D 7/02* | (2006.01) |
| *F16D 7/00* | (2006.01) |
| *F16D 43/21* | (2006.01) |
| *B25B 23/147* | (2006.01) |
| *B25B 23/14* | (2006.01) |
| *B25B 21/00* | (2006.01) |

(52) U.S. Cl.
CPC ............ *F16D 7/025* (2013.01); *B25B 23/141* (2013.01); *B25B 23/147* (2013.01); *F16D 7/005* (2013.01); *F16D 7/028* (2013.01); *F16D 43/215* (2013.01); *F16D 43/218* (2013.01); *B25B 21/00* (2013.01)

(58) Field of Classification Search
CPC ........ F16D 43/20; F16D 43/21; F16D 43/213; F16D 43/215; F16D 43/218; F16D 7/005; F16D 7/024; F16D 7/025; F16D 7/028; B25B 23/141; B25B 23/147; B25B 23/1475; B25B 21/00; B25B 21/008; B25B 21/02
See application file for complete search history.

(56) References Cited

U.S. PATENT DOCUMENTS

| | | | |
|---|---|---|---|
| 4,986,369 A | 1/1991 | Fushiya et al. | |
| 7,234,536 B2 | 6/2007 | Scholl et al. | |
| 7,455,123 B2 | 11/2008 | Aeberhard | |
| 8,251,158 B2 | 8/2012 | Tomayko et al. | |
| 8,316,959 B2 | 11/2012 | Roehm | |
| 8,434,564 B2 | 5/2013 | Tomayko et al. | |
| 2004/0194828 A1* | 10/2004 | Landhuis | F16H 61/4017 137/493.1 |

(Continued)

FOREIGN PATENT DOCUMENTS

| | | |
|---|---|---|
| DE | 102004058807 A1 | 6/2006 |
| DE | 102009027951 A1 | 1/2011 |

(Continued)

OTHER PUBLICATIONS

Knaust. Espacenet Machine Translation of DE102016104627. Sep. 14, 2017 (Year: 2017).*

*Primary Examiner* — Jacob S. Scott
*Assistant Examiner* — Lori Wu
(74) *Attorney, Agent, or Firm* — Muncy, Geissler, Olds & Lowe, P.C.

(57) ABSTRACT

A torque-dependent, releasable clutch for a hand-held power tool is specified, which includes a first clutch element, which interacts with a second clutch element to transmit a torque, at least one of the two clutch elements being movable with respect to the other clutch element and being pretensioned by a spring element, the spring element having a nonlinear load-displacement characteristic.

10 Claims, 5 Drawing Sheets

(56) References Cited

U.S. PATENT DOCUMENTS

2011/0017484 A1* 1/2011 Roehm ................ B23B 45/008
                                                                 173/178

FOREIGN PATENT DOCUMENTS

| DE | 102016104627 A1 | 9/2017 |
| EP | 0351179 A1 | 1/1990 |
| EP | 1623797 A1 | 2/2006 |
| EP | 2184138 A2 | 5/2010 |

* cited by examiner

TORQUE-DEPENDANT, RELEASABLE CLUTCH FOR A HAND-HELD POWER TOOL

BACKGROUND OF THE INVENTION

Field of the Invention

The invention relates to a torque-dependent, releasable clutch for a hand-held power tool, including a first clutch element, which interacts with a second clutch element to transmit a torque, at least one of the two clutch elements being movable with respect to the other clutch element and being pretensioned by a spring element.

Description of the Background Art

Torque-dependent, releasable clutches of this type have long been known through use in the prior art and are used, in particular, for screwdrivers having a settable deactivating element.

These are generally ball friction clutches having two clutch disks, which are coupled in a form-fitting manner via at least one ball, so that a torque is transmittable between the two clutch disks. The two clutch disks are pressed together in the idle position by a defined pretensioning force having a vertical active direction.

At least one clutch disk has one cam element for each ball as a form-fitting element.

When the torque reaches a certain value, the ball begins to ascend on the cam element, due to the circumferential force acting thereupon, on a slope which is less than 90° (with respect to the direction of the circumferential force). The cam on which the ball runs is designed in such a way that the tangential slope of the ball track decreases steadily, starting at a point above the idle position. As a result, the circumferential force needed to continue transporting the ball decreases continuously. The clutch is thus released or "opens" once a certain torque has been exceeded. The torque needed to continue opening the clutch decreases continuously due to the design of the cam and at some point approaches a value of 0 with a pure rolling friction due to the ball (i.e. the ball track is in parallel to the direction of the circumferential force).

The greater the pretensioning force, the greater the torque needed to open the clutch.

If the pretensioning force is generated by a pressure spring having a linear characteristic according to the prior art, the pretensioning force increases in proportion to the opening width of the clutch. With a continuous cam slope, the torque needed to further open the clutch would thus also increase proportionately.

By suitably combining the spring characteristic with a continuously flatter cam contour, it is possible to achieve the fact that, starting at a certain point, the torque needed for further rotation no longer increases or even decreases steadily as the opening displacement of the clutch increases.

Depending on which spring characteristic and tangential slope of a cam are present, it is possible to achieve the fact that the maximum opening torque required is reached at the point in time when the ball begins to ascend on the cam, or the torque initially further increases and decreases only starting at a certain opening displacement.

In the sense of a repetition-precise functioning of the clutch, i.e. a defined opening element, an attempt is made for the maximum torque to be present not only at the instant at the point in time when the clutch begins to open.

In this manner, for use in a screwdriver, for example, it is possible to prevent a screw connection to be tightened to a certain torque from being tightened too much or from being additionally re-tightened when opening the clutch.

To ensure such an operating behavior of the clutch described above as reliably as possible, the instantaneously present pretensioning force of the two clutch disks should ideally not increase or only to a slight degree during opening. This may be achieved, for example, by means of a very flat load displacement characteristic of the spring.

If the load-displacement characteristic is too steep, the disadvantageous effect described above occurs, that the maximum torque is reached only after a certain opening displacement.

In practice, this principle makes itself felt as follows in a screwdriver:

The minimum torque at which the sought-after operating behavior described above is still ensured depends solely on the pretensioning force and its increase during opening in the case of a predefined cam contour. If the pretensioning force is generated, for example, by a pressure spring made from steel, the load-displacement characteristic of the spring is decisive to the minimum safe release torque of the clutch.

However, the maximum achievable torque is limited by the load-displacement characteristic and the maximum spring length.

This means that the flatter the load-displacement characteristic, the lower the minimum torque at which a reliable release is ensured. However, the usable torque also dwindles because the maximum torque is limited by the finite length of the spring.

SUMMARY OF THE INVENTION

It is therefore an object of the present invention to provide a torque-dependent, releasable clutch for a handheld power tool such that a reliable release is ensured over a preferably wide range of torques.

According to an exemplary embodiment of the invention, this object is achieved for a torque-dependent, releasable clutch in that a spring element has a nonlinear load-displacement characteristic.

A nonlinear load-displacement characteristic can be used for the spring element, and therefore a wider range may be employed for the achievable pretensioning force than when using a spring element having a linear load-displacement characteristic according to the prior art.

The release torque of the clutch may thus be varied over a wider range of torques with a predetermined size.

For this purpose, the spring element can have a progressive load-displacement characteristic.

This means that the pretensioning force of the spring increases at a greater rate as the spring displacement increases than would be the case with a linear characteristic. In this manner, it is ensured that the spring element facilitates a relatively low minimum release torque of the clutch as well as a higher release torque when desired.

The spring element can be a pressure spring, in particular a helical spring, in which the diameter of the turns is varied over the length and/or the wire diameter is varied over the length and/or the pitch of the turns is varied over the length.

There are different possibilities, which are generally known for providing a spring having a progressive load-displacement characteristic. Multiple of the aforementioned parameters may, of course, also be combined with each other, so that the individual progression effects achieved structurally overlap and reinforce each other.

The spring element can be designed as a rotationally symmetrical pressure spring having a variable pitch and/or a variable turn diameter.

In this manner, a reliable release of the clutch is ensured over a greater range of torques, without modifying the design of the clutch elements and without a significant added complexity arising for this purpose during the manufacture or mounting of the components.

Another advantage of the use of a spring element having a progressive load-displacement characteristic results when the clutch is set to a certain torque in predefined displacement steps: by selecting a suitable nonlinear spring characteristic, a change in the torque per displacement step may be adjusted in relative terms to both the lower and upper torque range, which would not be possible with a linear spring characteristic.

If the clutch is used in a screwdriver, the advantage arises that the setting of the release torque may be carried out with approximately the same degree of sensitivity across the entire torque range.

In addition, a progressive spring characteristic offers a greater operating reliability in the lower torque range. Due to the low spring rate in the vicinity of the deflection from zero, the pretensioning force for the minimum torque may be built up over a relatively great distance, which makes the length tolerances of the spring element uncritical. If an end stop is present and with a correct design of the spring characteristic, the clutch may thus never be relaxed to such a degree that the pretensioning force becomes zero or the clutch falls open due to the lack of sufficient pretension.

The clutch is also usable as a friction clutch, in particular as a disk clutch or cone clutch.

For example, the clutch, which can be used in screwdrivers, can be designed as a rolling element friction clutch, in which the two clutch elements are coupled to each other with the aid of at least one rolling element, which interacts with at least one guide curve on the two clutch elements.

In this manner, a practically wear-free clutch having a defined release torque is achievable, which may be set over a wide range.

The at least one rolling element can be designed as a ball or roller.

The guide curve can be closed in the circumferential direction and has at least one cam element, which interacts with at least one rolling element.

A tensioner can be provided for setting a pretensioning force acting upon the spring element.

The release torque of the clutch may thus be set over a certain range.

The object of the invention is furthermore achieved by a handheld power tool, for example, an electrical handheld power tool, in particular a screwdriver, which comprises a clutch of the type mentioned above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
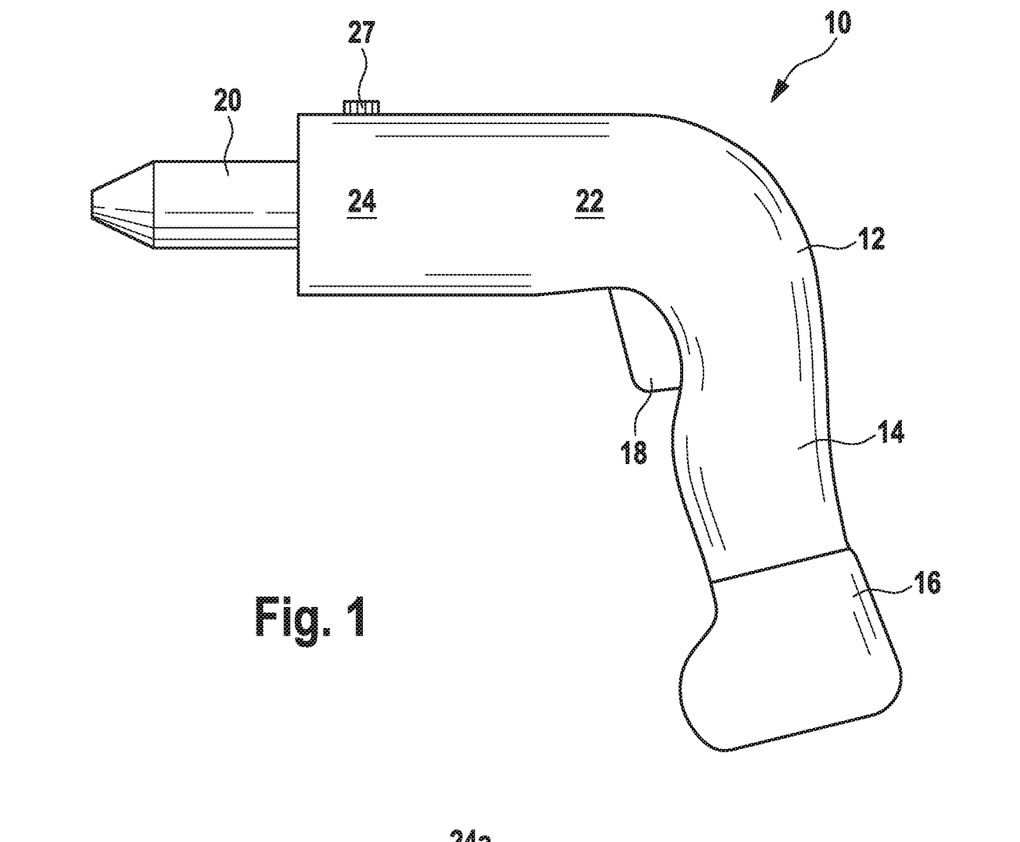
FIG. 1 shows a greatly simplified side view of a handheld power tool according to the invention in the form of a screwdriver, which comprises a clutch according to the invention.

FIG. 1 shows a greatly simplified side view of a handheld power tool according to the invention in the form of a screwdriver, which is designated as a whole by reference numeral 10.

Handheld power tool 10 includes a housing 12, which has a pistol-shaped handle 14, on the lower end of which a batter pack 16 is removably provided. A switch 18 in the form of a pistol trigger is provided on handle 14 for turning on the screwdriver. In housing 12, a drive comprising an electric motor and a gearset, for example in the form of a planetary gearset, is indicated by reference numeral 22. Drive 22 activates a torque-dependent, releasable clutch 24, whose output drives a tool holder 20 in the form of a bit holder. The release torque of clutch 24 is settable with the aid of a setting device 27.

Figure 2:
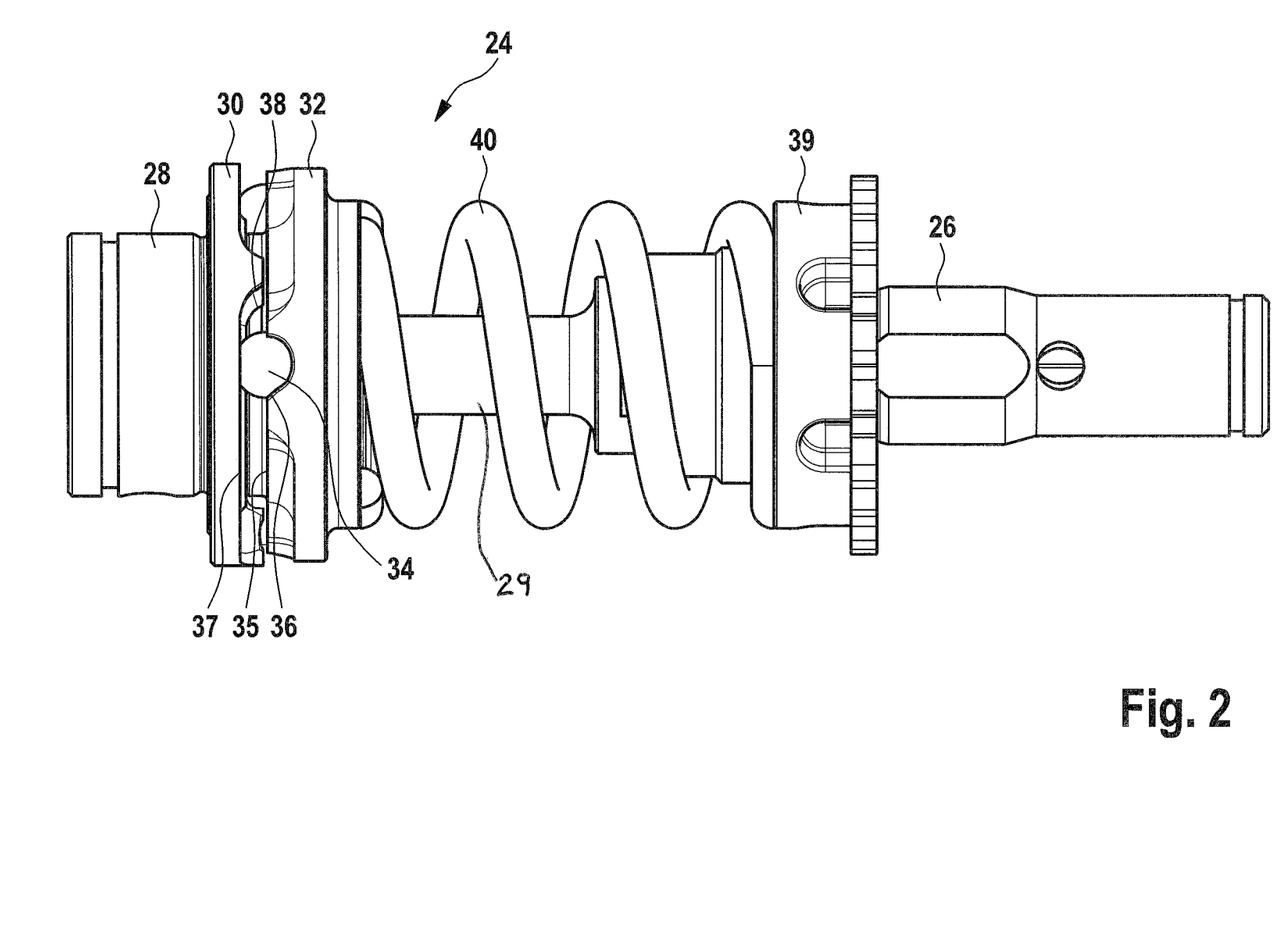
FIG. 2 shows an enlarged side view of a torque-dependent, releasable clutch in the form of a ball friction clutch, which has a spring element in the form of a helical spring.

FIG. 2 shows the general structure of a torque-dependent, releasable clutch 24, which may be used in handheld power tool 10.

Clutch 24 is designed as a ball friction clutch and has a first clutch element 30, which interacts with a second clutch element 32. First clutch element 30 is driven by a drive shaft 28. A flange 39 is provided on output shaft 26, on which a spring element 40 in the form of a helical spring is supported, with the aid of which second clutch element 32 is pretensioned in the direction of first clutch element 30. Second clutch element 32 is accommodated on a shank 29 of output shaft 26 in a rotatably fixed manner yet displaceable in the axial direction against the action of the tension of spring element 40.

A guide curve 35, running in the circumferential direction and having a plurality of recesses 36 for accommodating rolling elements 34 in the form of balls, is provided on second clutch element 32. In the present case, four rolling elements 34, and consequently also four assigned recesses 36, are provided on guide curve 35. A guide curve 37 running in the circumferential direction is provided on first clutch element 30, a cam element 38 being assigned to each rolling element 34.

A form-fitting transmission of torque from drive shaft 28 via first clutch element 30 to second clutch element 32 and thus to output shaft 26 normally results with the aid of recesses 36 on second clutch element 32, rolling elements 34 and assigned cam elements 38.

Second clutch element 32 is tensioned with respect to first clutch element 30 by the pretensioning force of spring element 40.

A torque-dependent release of clutch 24 is explained in greater detail below on the basis of FIGS. 3 through 5.

Figure 3:
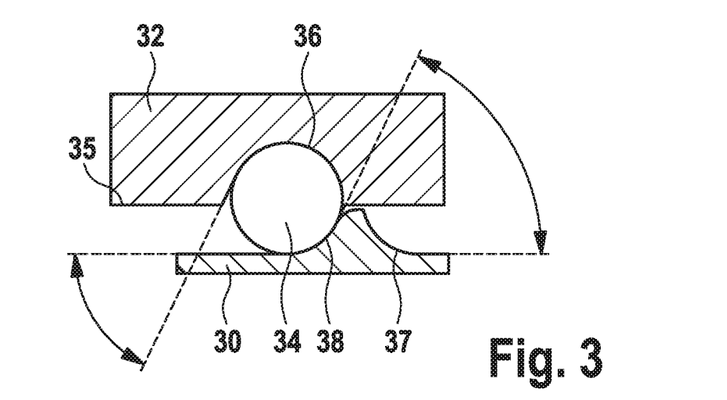
FIGS. 3-5 show schematic representations, which illustrate the two interacting clutch elements, including a ball which ascends on a cam element, in different phases, FIG. 3 illustrating a closed clutch, FIG. 4 illustrating the start of the opening of the clutch, and FIG. 5 showing the complete release of the clutch.

FIG. 3 shows the form-fitting transmission of torque from first clutch element 30 to second clutch element 32. Rolling element 34 in the form of the ball is accommodated within an assigned recessed 36 on guide curve 35 and abuts the edge of an assigned cam element 38 on guide curve 37 of first clutch element 30. A form-fitting torque transmission thus results.

Figure 4:
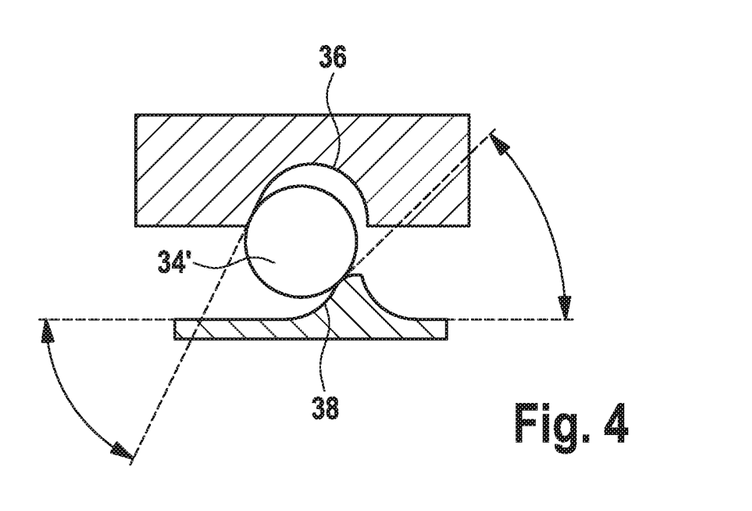

FIG. 4 shows clutch 24 in a half-open state. This means that the torque has increased in such a way that the pretensioning force of spring element 40 has been overcome, and the rolling element has moved into illustrated location 34'. In this case, a rolling friction and a sliding friction are present.

Figure 5:
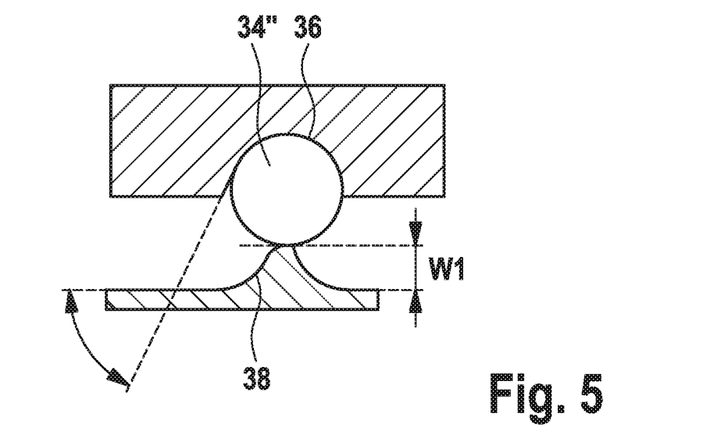

FIG. 5 shows the fully open clutch. The torque has increased to the extent that rolling element 34" has reached the apex of cam element 38, and the clutch is now open all the way. Rolling element 34" has rolled back into recess 36, since the vertical force component is becoming greater than the horizontal one. W1 shows the maximum opening displacement in the axial direction resulting for clutch 24.

According to the invention, a spring element 40 having a nonlinear load-displacement characteristic is used, preferably a spring element 40 having a progressive load-displacement characteristic.

Figure 6:
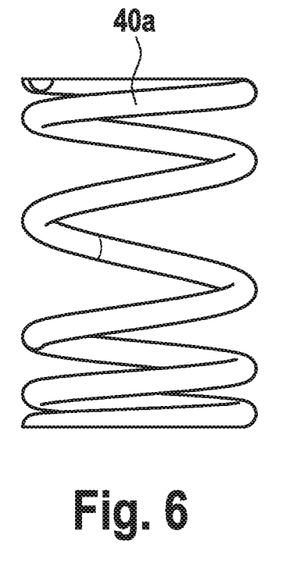
FIG. 6 shows a cylindrical spring element having a progressive characteristic with a variable turn pitch.
Figure 7:
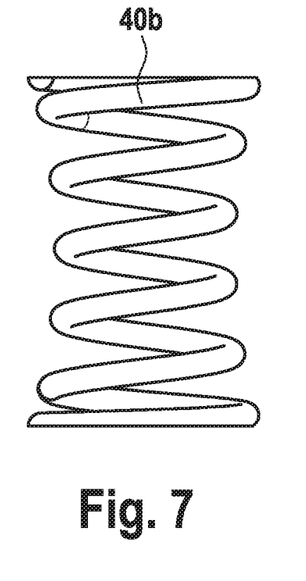
FIG. 7 shows a tapered spring element having a progressive characteristic with a invariable turn pitch.
Figure 8:
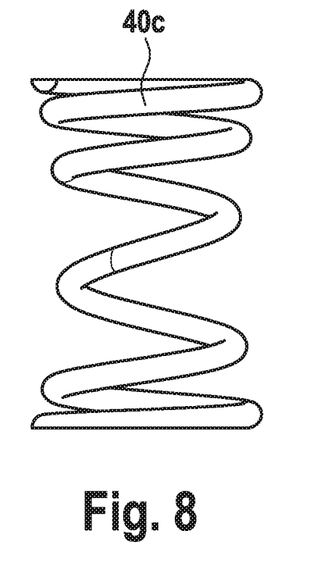
FIG. 8 shows a tapered spring element having a variable turn pitch and a greatly progressive spring characteristic.

FIGS. 6 through 8 show three variants of such a spring element having a progressive characteristic.

FIG. 6 shows a spring element 40a in the form of a cylindrical spring having a variable turn pitch.

FIG. 7 shows a spring element 40b in the form of a tapered spring having an invariable turn pitch.

FIG. 8 shows a spring element 40c in the form of a tapered spring having a variable turn pitch. A highly progressive characteristic results due to a structural interference between the tapering and variable pitches.

Figure 9:
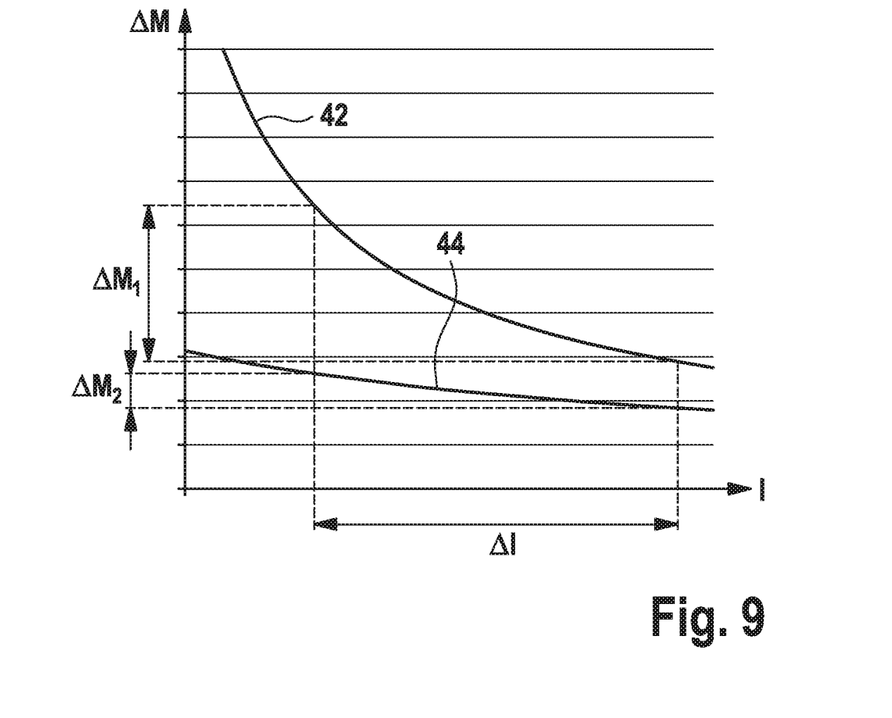
FIG. 9 shows a diagram which illustrates the increase in torque, expressed as a percentage, for each displacement step in a spring element having a linear displacement characteristic and in a spring element having a nonlinear characteristic.

FIG. 9 shows torque increase ΔM, expressed in percentage, as a function of spring displacement I.

Characteristic 42 shows the relative change in torque per displacement step for a linear spring element. Curve 44 shows the relative change in torque for each displacement step for a nonlinear spring element having a progressive characteristic.

ΔI indicates the torque setting range.

The assigned relative change in torque per displacement step is very large with linear characteristic 42 and a low torque, but becomes small at higher torques.

With the nonlinear, progressive characteristic, assigned characteristic 44 demonstrates a relative change in torque which is nearly constant for each displacement step over entire torque setting range ΔI.

Figure 10:
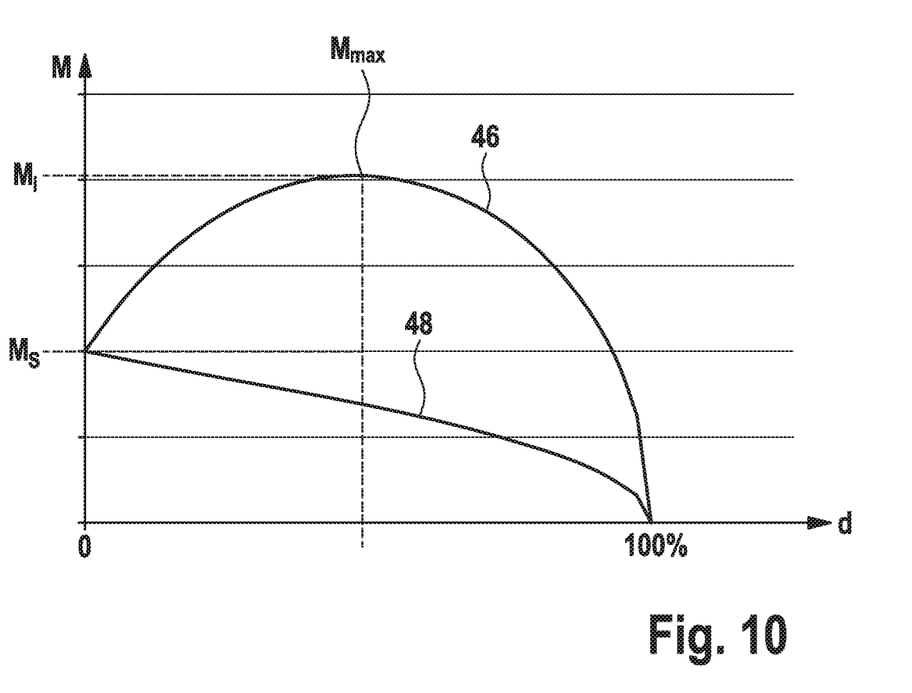
FIG. 10 shows the schematic representation of a torque profile in the clutch according to FIG. 2 over the opening displacement at a high spring rate and at a low spring rate.

FIG. 10 shows the sought-after release behavior of the clutch with the torque profile of the clutch over the opening displacement.

When using a spring element having a high spring constant and too low a pretensioning force, maximum torque $M_{max}$ results with an opening displacement >0. Conversely, if a spring element having a low spring constant or a sufficient pretensioning force is used, curve 48 results, release torque $M_s$ being at its maximum with a minimum opening displacement and then continuously decreasing up to the maximum opening displacement of 100%. This case represents the optimum state. The maximum transmitted torque is always reached precisely when the clutch opens, regardless of the pretensioning force selected. With a torque profile as represented in characteristic 46, different coefficients of friction of clutch elements 30, 32 and rolling element 34 may influence the maximum torque.

Figure 11:
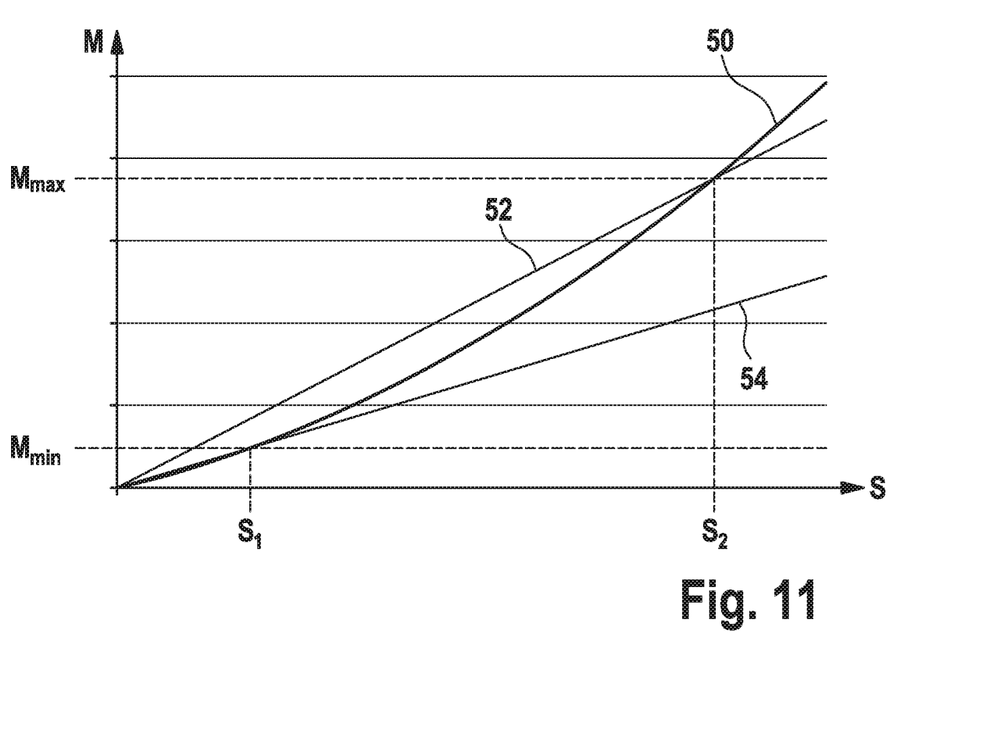
FIG. 11 shows a schematic representation of the release torque of the clutch according to FIG. 2 as a function of the spring displacement in the case of a nonlinear spring element having a steadily increasing (progressive) characteristic, as well for a spring element having a steep, linear load-displacement characteristic and for a spring element having a flat, linear load-displacement characteristic.

Finally, FIG. 11 shows a representation of torque M over opening displacement s of the clutch. Characteristic 50 shows the correlation which results when a spring element according to the invention having a progressively increasing load-displacement characteristic is used. Minimum torque Mmin, which results at spring displacement s1, increases approximately proportionately up to maximum torque Mmax, which results at maximum spring displacement s2. If a spring element having a linear spring constant with a steep characteristic is used, on the other hand, curve 52 would result. If a spring element having a linear spring characteristic is used, which is correspondingly flatter, a significantly lower maximum torque Mmax would result at spring displacement s2 with the same minimum torque Mmin, as displayed in curve 54.

Conversely, an inadequate minimum torque would result at $s_1$, compared to characteristic 52 having a higher linear spring rate.

Figure 12:
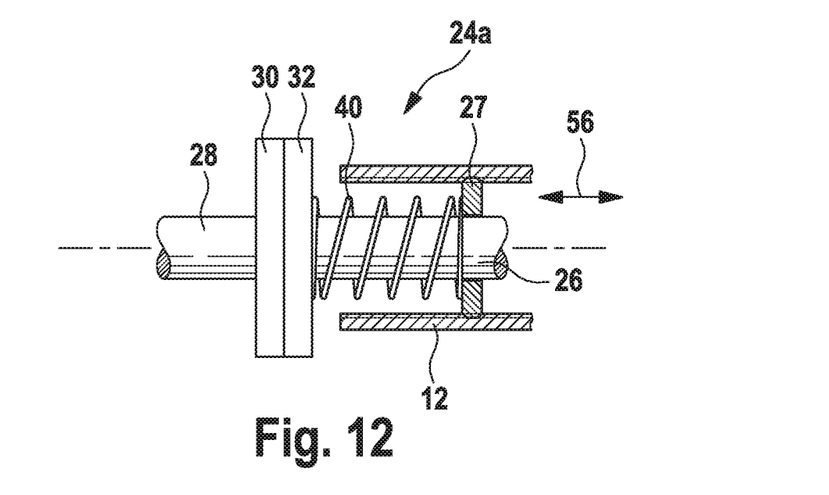
FIG. 12 shows a torque-dependent, releasable clutch.

FIG. 12 shows an alternative embodiment of a torque-dependent, releasable clutch, which is designated as a whole by 24a. Instead of a ball friction clutch, this clutch 24a is designed as a friction clutch having two interacting, plate-shaped coupling elements 30, 32.

First coupling element 30, which is driven by drive shaft 26, is pretensioned against second coupling element 32 via a spring element 40a having a progressive spring characteristic. A setting device is used to adjust the pretension, which is indicated only by a disk 27, adjustable in the axial direction, as illustrated by double arrow 56.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A torque-dependent, releasable clutch for a handheld power tool comprising:
   a first clutch element;
   a second clutch element that interacts with the first clutch element to transmit a torque, the first clutch element being movable with respect to the second clutch element; and
   a spring element adapted to pretension the first and the second clutch element, the spring element having a nonlinear load-displacement characteristic, wherein the spring element is a helical spring, in which a diameter of the turns is varied over a length and/or a wire diameter is varied over the length and/or a pitch of turns of the spring element is varied over the length, wherein the clutch is a rolling element friction clutch, in which the first and second clutch elements are coupled to each other via at least one rolling element, which interacts with at least one guide curve on the first clutch element and at least one guide curve on the second clutch element, and wherein the at least one guide curve of the first clutch element is provided at a first surface of the first clutch element and the at least one guide curve of the second clutch element is provided at a first surface of the second clutch element, and wherein the first surface of the first clutch element opposes the first surface of the second clutch element.

2. The clutch according to claim 1, wherein the spring element has a progressive load-displacement characteristic.

3. The clutch according to claim 1, wherein the at least one rolling element is a ball or roller.

4. The clutch according to claim 3, wherein the at least one guide curve of the second clutch element includes at least one recess that accommodates the ball or roller therein.

5. The clutch according to claim 1, wherein the at least one guide curve of the first clutch element is closed in a circumferential direction and has at least one cam element, which interacts with the at least one rolling element.

6. The clutch according to claim 1, further comprising a tensioner to set a pretensioning force that acts upon the spring element.

7. A handheld power tool that comprises a clutch according to claim 1.

8. The handheld power tool according to claim 7, wherein the handheld power tool is an electrical handheld power tool or a screwdriver.

9. A torque-dependent, releasable clutch for a handheld power tool comprising:
 a first clutch element;
 a second clutch element that interacts with the first clutch element to transmit a torque, the first clutch element being movable with respect to the second clutch element; and
 a spring element adapted to pretension the first and the second clutch element, the spring element having a nonlinear load-displacement characteristic, wherein the spring element is a helical spring, in which a diameter of the turns is varied over a length and/or a wire diameter is varied over the length and/or a pitch of turns of the spring element is varied over the length, wherein the clutch is a rolling element friction clutch, in which the first and second clutch elements are coupled to each other via at least one rolling element, which interacts with at least one guide curve on the first clutch element and at least one guide curve on the second clutch element, wherein the at least one guide curve of the first clutch element is closed in a circumferential direction and has at least one cam element, which interacts with the at least one rolling element, and wherein the at least one cam element protrudes from the at least one guide curve of the first clutch element in a direction towards the second clutch element, and wherein the at least one cam element interacts with the at least one rolling element, such that the at least one rolling element rolls up a side surface of the at least one cam element and onto a top surface of the at least one cam element when the first clutch element is moved with respect to the second clutch element.

10. A torque-dependent, releasable clutch for a handheld power tool comprising:
 a first clutch element;
 a second clutch element that interacts with the first clutch element to transmit a torque, the first clutch element being movable with respect to the second clutch element; and
 a spring element adapted to pretension the first and the second clutch element, the spring element having a nonlinear, progressive load-displacement characteristic, wherein the spring element is a helical spring, in which a diameter of the turns is varied over a length and/or a wire diameter is varied over the length and/or a pitch of turns of the spring element is varied over the length, and wherein the nonlinear, progressive load-displacement characteristic is configured such that over an entire torque setting range $\Delta I$, a relative change in torque $\Delta M$ per displacement step is nearly constant.

* * * * *